United States Patent
Nicholls et al.

(10) Patent No.: US 10,583,845 B1
(45) Date of Patent: Mar. 10, 2020

(54) SYSTEMS AND METHODS FOR DETECTING AND ALERTING SECURITY THREATS IN VEHICLES

(71) Applicant: Honeywell International Inc., Morris Plains, NJ (US)

(72) Inventors: James Alexander Nicholls, Glendale, AZ (US); John Stokely, Albuquerque, NM (US); Dereck Clark, Glendale, AZ (US); Yasuo Ishihara, Kirkland, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/175,574

(22) Filed: Oct. 30, 2018

(51) Int. Cl.
  *B60W 50/14* (2012.01)
  *G01C 21/34* (2006.01)
  *G08G 5/00* (2006.01)

(52) U.S. Cl.
  CPC ......... *B60W 50/14* (2013.01); *G01C 21/3461* (2013.01); *G08G 5/006* (2013.01); *G08G 5/0013* (2013.01); *G08G 5/0039* (2013.01); *G08G 5/0056* (2013.01); *B60W 2050/143* (2013.01)

(58) Field of Classification Search
  CPC ............ B60W 50/14; B60W 2050/143; G01C 21/3461; G08G 5/0013; G08G 5/0039; G08G 5/0056; G08G 5/006
  See application file for complete search history.

(56) References Cited

U.S. PATENT DOCUMENTS

| | | | |
|---|---|---|---|
| 6,178,379 B1* | 1/2001 | Dwyer | G01S 19/15 244/175 |
| 6,965,816 B2 | 11/2005 | Kline | |
| 7,376,494 B2 | 5/2008 | Arnouse | |
| 2003/0065428 A1* | 4/2003 | Mendelson | G05D 1/0055 701/9 |
| 2003/0193409 A1 | 10/2003 | Crank | |
| 2004/0008253 A1* | 1/2004 | Monroe | G08B 13/19641 348/143 |
| 2004/0056762 A1* | 3/2004 | Rogers | G08G 1/167 340/425.5 |
| 2004/0204801 A1 | 10/2004 | Steenberge | |
| 2005/0216138 A1 | 9/2005 | Turung | |

(Continued)

FOREIGN PATENT DOCUMENTS

CN 1666239 9/2005

OTHER PUBLICATIONS

Dane et al., "Aircraft Security Door Lock Override By Intelligent Aircarft Situtational Awareness", Aug. 19, 2015, IP.com No. 000242800.*

(Continued)

*Primary Examiner* — James J Yang
(74) *Attorney, Agent, or Firm* — Bookoff McAndrews, PLLC

(57) ABSTRACT

Systems and methods are disclosed for detecting security threats during vehicle operations. For instance, retrieving a route plan for a route of a vehicle from a database of the vehicle; identifying either a portion of the route or a portion of the route plan as a security threat based on an analysis of the route plan; and in response to identifying the portion of the route or the portion of the route plan as the security threat, transmitting an alert of the security threat.

18 Claims, 4 Drawing Sheets

(56) References Cited

U.S. PATENT DOCUMENTS

| | | | |
|---|---|---|---|
| 2006/0167598 A1* | 7/2006 | Pennarola | G08G 5/0013 |
| | | | 701/11 |
| 2009/0082954 A1* | 3/2009 | Ridenour, II | G01C 23/005 |
| | | | 701/467 |
| 2011/0153212 A1* | 6/2011 | De Brito | G05D 1/0055 |
| | | | 701/301 |
| 2011/0246002 A1 | 10/2011 | Shavit | |
| 2014/0354402 A1* | 12/2014 | Joao | G07C 9/00571 |
| | | | 340/5.52 |
| 2016/0292932 A1* | 10/2016 | Gremmert | G07C 5/008 |
| 2018/0155052 A1* | 6/2018 | Lacroix | G08G 5/0013 |

OTHER PUBLICATIONS

Dane et al., "Aircraft Security Door Lock Override By Intelligent Aircraft Situational Awareness", Aug. 19, 2015, IP.com No. 000242800.

* cited by examiner

SYSTEMS AND METHODS FOR DETECTING AND ALERTING SECURITY THREATS IN VEHICLES

TECHNICAL FIELD

Various embodiments of the present disclosure relate generally to detecting security threats in vehicles and, more particularly, to monitoring data systems in vehicles for errors, data corruption, data tampering, and malicious activity of authorized and unauthorized personnel.

BACKGROUND

Vehicles of all types are becoming increasingly complex, as they are fitted with network connections, automated operation components (e.g., "auto-pilot" or "self-driving" features), connected safety and security features, and the like. As vehicles become increasingly complex and connected, a range of security issues have become more prevalent, and the mechanisms to detect and remedy the security issues need to advance accordingly. These security issues include both physical security and cyber security issues from actors both inside and outside the vehicle operating organization.

In the field of aircraft vehicles, in particular, several aircraft incidents have occurred in which personnel on board the aircraft, including crew members, have deliberately flown the aircraft off course or the aircraft has deviated from a planned flight path. A first example is the Germanwings Flight 9525 incident. The Germanwings Flight 9525 incident involved a co-pilot locking other vehicle operators outside the cockpit and initiating a controlled descent until the aircraft impacted a mountainside of the French Alps. A second example is the Malaysia Airlines Flight 370 incident. The Malaysia Airlines Flight 370 incident involved a missing aircraft that was out of radar detection from Air Traffic Control (ATC) and military radar over open ocean, while deviating westwards from the aircraft's planned flight path and transmitting Inmarsat satellite messages.

Also, flight crews may be flying off course due to unintentional changes and/or intentional malicious changes of an aircraft database (or databases), for example the Flight Management System (FMS) and/or a terrain database in a synthetic vision system. These changes may occur via cyber-attacks mechanisms that may not be easily detectable by an unsuspecting flight crew. This can become especially challenging if the flight crew is flying in automatic fully-coupled flight control modes of operation on approach or departure, and could be compounded in poor weather conditions. Furthermore, a concern in providing aircraft data security involves ensuring that any databases, for example the FMS navigation database and/or terrain and obstacle databases for synthetic vision display, are not maliciously tampered with. Cyber security issues may result in aircraft sensors being corrupted such that misleading aircraft guidance or other data is provided to the aircrew or autopilot.

With or without aircraft datalink connectivity, it may be possible for a malicious actor with physical access to the aircraft to deliberately corrupt a database of the aircraft in a subtle, but malicious manner. Data may be deliberately corrupted in a manner where a checking mechanism is also defeated. For example, Cyclic Redundancy Checks (CRC) for a corrupted data value could be calculated and used to replace the CRC of the original data along with replacing the original data. These mechanisms might also not be effective after the data has been decoded in the system and the CRCs or other protective layers have been removed from the data, such as when an authorized or unauthorized entity has physical access or local network access to the various databases. Existing efforts to address physical security and cyber security in aircraft have focused on adding security protections to the cockpit (e.g., cockpit door locks) and adding security protections to the primary avionics to preclude outside actors from gaining access. These techniques typically rely on trusted actors within the aircraft operating organization to operate the vehicle and perform maintenance and maintain security of access mechanisms, such as passwords. Thus, these techniques are susceptible to the potential for undiscovered cyber security threats and for even trusted actors to act in a malicious manner. Specifically, a trusted actor could purposefully deviate from a planned flight path. Further, a trusted actor could alter on-board systems so that one or more sub-systems indicate data to the flight crew that could cause the flight crew to deviate from a planned flight path, to deviate from standard and safe routes or approaches, to descend at an incorrect destination, to request a destination change, and to plan a flight path through restricted air space.

The present disclosure is directed to systems and methods for addressing these goals and interests. Thus, techniques discussed herein disclose systems and methods for detecting security threats in vehicle systems and operations.

SUMMARY OF THE DISCLOSURE

According to certain aspects of the disclosure, systems, methods, and computer readable media are disclosed for detecting security threats during vehicle operations utilizing an on-board monitoring system.

For instance, the method may include retrieving, by the on-board monitoring system, a route plan for a route of a vehicle, from a database of the vehicle; identifying either a portion of the route or a portion of the route plan as a security threat based on an analysis of the route plan; and in response to identifying the portion of the route or the portion of the route plan as the security threat, transmitting an alert of the security threat.

The on-board monitoring system for detecting security threats during vehicle operations of a vehicle, may include a data storage device storing instructions associated with vehicle data systems; and a processor configured to execute the instructions to perform a method. The method including retrieving a route plan for a route of the vehicle from a database of the vehicle; identifying either a portion of the route or a portion of the route plan as a security threat based on an analysis of the route plan; and in response to identifying the portion of the route or the portion of the route plan as the security threat, transmitting an alert of the security threat.

The non-transitory computer-readable medium storing instructions that, when executed by an on-board monitoring system, may cause the on-board monitoring system to perform a method for detecting security threats during vehicle operations of a vehicle. The method may include retrieving a route plan for a route of the vehicle from a database of the vehicle; identifying either a portion of the route or a portion of the route plan as a security threat based on an analysis of the route plan; and in response to identifying the portion of the route or the portion of the route plan as the security threat, transmitting an alert of the security threat via the wireless communication interface.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
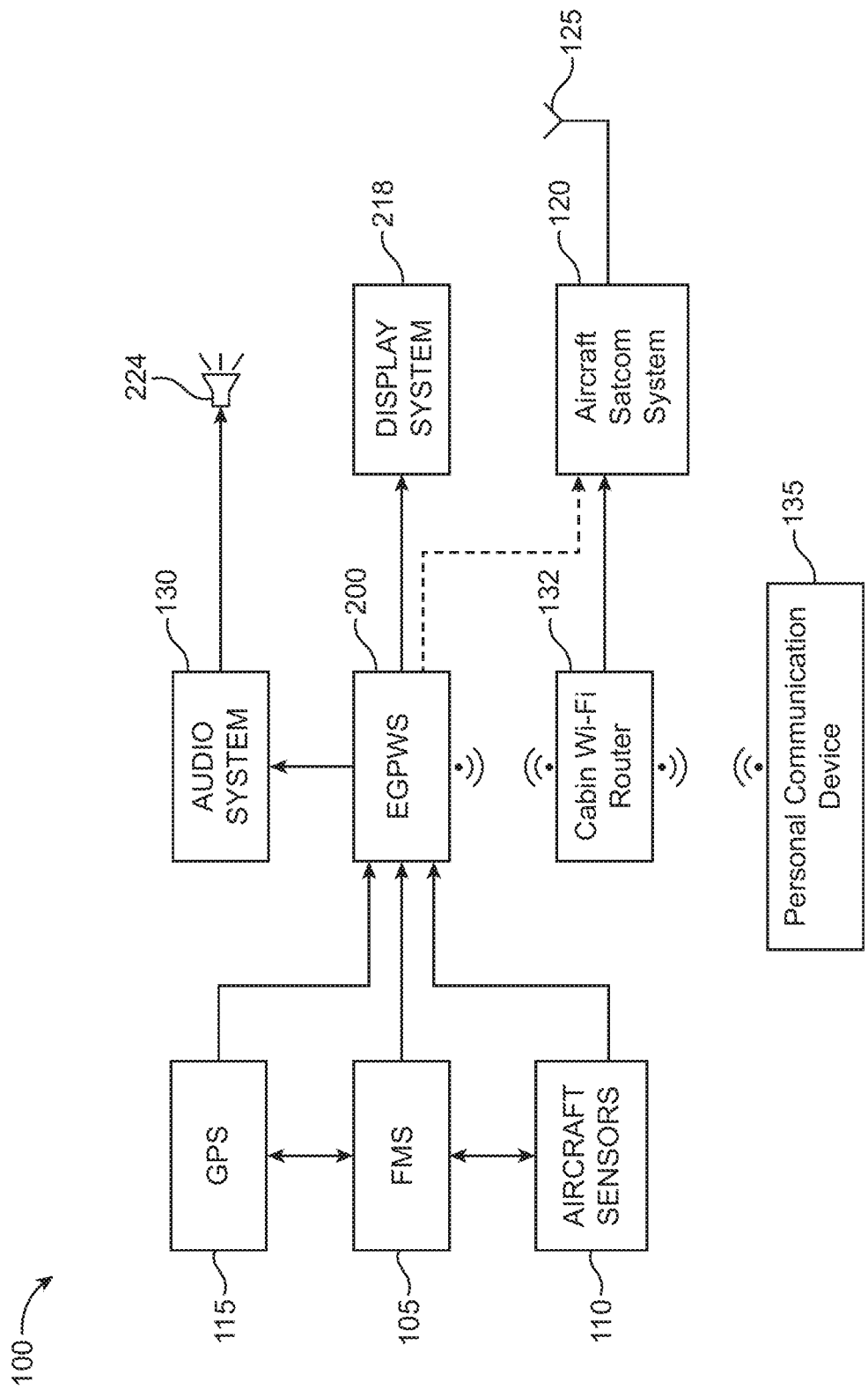
FIG. 1 depicts an exemplary data infrastructure for an aircraft system, according to techniques presented herein.

Various embodiments of the present disclosure relate generally to detecting security threats and, more particularly, to monitoring data in aircraft systems for errors, data corruption, data tampering, and malicious activity of authorized and unauthorized personnel.

In general, the present disclosure is directed to use of an enhanced ground proximity warning system and wireless connectivity interface for implementing a malicious actor or other cyber security threat alert system. As described in more detail below, the proposed malicious actor alert could be implemented by using an enhanced ground proximity warning system ("EGPWS"). The software algorithms to detect suspicious behavior may be implemented in the EGPWS. Connection to the ground may be implemented by using a Wi-Fi connection to the cabin satcom system together with a VPN to provide security of the datalink. The Wi-Fi interface may also be used to provide alerts to other cabin crew members including any air marshal on board. The datalink connection to the ground may be used to validate unusual flight path changes and to alert cognizant personnel on the ground. While there are significant cyber security concerns associated with linking cockpit systems to the cabin, these concerns may be mitigated by the use of the VPN connection and by the fact that while the EGPWS system receives substantial data from aircraft systems, its ability to transmit data to other aircraft systems may be very limited.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

While this disclosure describes the systems and methods with reference to aircraft (e.g., aircraft primary avionics systems), it should be appreciated that the present systems and methods are applicable to security of any vehicle management systems, including those of drones, automobiles, trains (locomotives), or any other autonomous and/or Internet-connected vehicle.

Referring now to the appended drawings, FIG. 1 depicts an exemplary data infrastructure for a vehicle, such as an aircraft system, according to techniques presented herein. In general, FIG. 1 depicts an exemplary data infrastructure system 100 for detecting security threats of an aircraft system. As shown, exemplary data infrastructure system 100 comprises a global positioning system ("GPS") 115, flight management system ("FMS") 105, aircraft sensors 110, audio system 130, enhanced ground proximity warning system (or "EGPWS" or on-board monitoring system) 200, aircraft satcom system (datalink) 120, speaker 224, display system 218, Cabin Wireless Fidelity (Wi-Fi) Router 132, and Personal Communication device 135.

A flight management system (or "FMS") 105 may be any type of computer that acts as a type of navigation equipment, and may be configured for receiving input data from a variety of other navigational instruments. Other navigational instruments may include aircraft sensors 110, such as inertial navigation instruments, radio navigational instruments, including one or more very high frequency omnidirectional radio range (VOR) systems, and global positioning system (GPS) 115. Aircraft sensors 110 may generate various data, including altitude data, heading data, air data reference, radar altimeter data, etc. Using this data and/or data from the GPS 115, the FMS 105 may generate position information, and may further engage in in-flight management of a flight plan, which may be stored in an FMS database (or database of vehicle). Using FMS database data, the FMS 105 may calculate a course for the aircraft to follow, including a lateral flight plan and/or a vertical flight plan.

The enhanced ground proximity warning system (EGPWS or on-board monitoring system) 200 is configured to alert pilots if the aircraft is in immediate danger of impacting the ground or an obstacle. EGPWS 200 may receive data from many aircraft systems including FMS 105, GPS 115, and/or aircraft sensors 110, such as air data, radar altimeter, inertial system, etc. EGPWS 200 may be configured to communicate with datalink 120 by direct communication (dashed line) or indirect communication (through the cabin Wi-Fi router 132). The data link 120 may have one or more antenna 125. EGPWS 200 may further communicate with audio system 130, which may produce an audio output at one or more speakers 224, which may comprise, for example, an audible alarm if the airplane altitude falls below a threshold. FMS 105 and/or EGPWS 200 may be associated with at least one display system 218, which may display flight path information, location information, ground proximity data, temperature data, aircraft sensor data, etc., to the crew. EGPWS 200 may further include a Wi-Fi router (not shown), either connected thereto or built-in, which may communicate with cabin Wi-Fi router 132. Cabin Wi-Fi router 132 may communicate with aircraft satcom system 120 and at least one personal communication device 135. Personal communication device 135 may belong to one or both of a member of the flight crew or an air marshal, and personal communication device 135 may be a cell-phone, a mobile computer, a tablet, etc.

Figure 2:
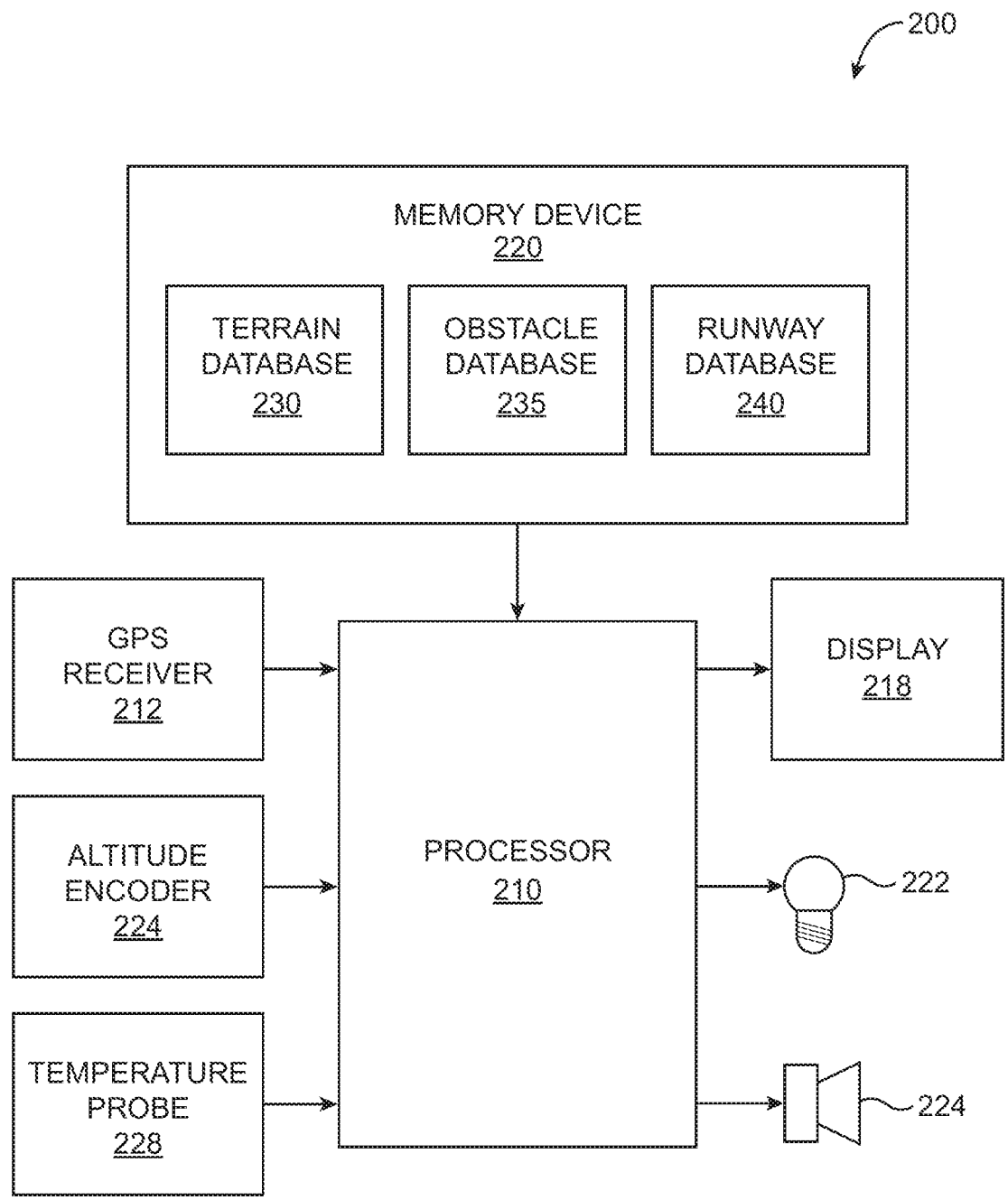
FIG. 2 depicts an exemplary infrastructure for an Enhanced Ground Proximity Warning System (EGPWS), according to techniques presented herein.

FIG. 2 depicts an exemplary infrastructure for EGPWS 200, according to techniques presented herein. In one embodiment, EGPWS 200 may have a memory or data store 220 comprising an independent copy of one or more of aircraft databases, including a terrain database 230, obstacle database 235, and navigation and/or runway database 240. EGPWS 200 may further comprise a processor 210, GPS receiver 212, altitude encoder 224, temperature probe 228, display 218, alert/light 222, and speaker 224. The EGPWS 200 may also include a set of input and/or output (IO) paths (not shown) for monitoring data on aircraft data busses. The IO may include analog signals, discrete signals, Arinc 429, RS-422, and/or RS-232 data, and/or Ethernet databuses. Processor 210 may be configured to retrieve data from memory and/or data store 220, and/or receive data from aircraft sensors 110, to perform techniques presented herein. Processor 210 may be configured to produce outputs to display 218, such as to a computer screen, outputs to one or more indicator lights 222, outputs to one or more audio speakers 224, and/or outputs to cabin Wi-Fi router 132 or data link 120.

EGPWS 200 may be associated with, and transmit and receive data to and from, a separate array of sensors, which may be embedded, such as GPS receiver 212, altitude encoder 224, and/or temperature probe 228, any of which may be embedded in the EGPWS 200 or separate from EGPWS 200. These sensors may be independent or duplicates of sensors associated with the FMS 105, or other aircraft sensors. All of the foregoing sensors may transmit data to processor 210 and be stored in data store 220 (collectively "route parameters" or "flight parameters"). EGPWS 200 may be configured to use independent database copies and connections to aircraft sensors to monitor other aircraft systems, such as FMS 105, and provide alerts to the crew and/or ground in the event of a security threat. EGPWS 200 may share a display with FMS 105, or there may be separate displays. The display 218 of EGPWS 200 may be used to provide alerts to the crew. Potential security threats could also be provided to this display 218. For example, in one embodiment, FMS 105 may transmit flight plan information to display system 218 as well as to EGPWS 200.

In one embodiment, the EGPWS 200 may receive the flight plan information data from the FMS 105, while the EGPWS 200 receives sensor data information from the various sensors (e.g., GPS receiver 212, altitude encoder 224, and/or temperature probe 228, or aircraft sensors 110 or GPS 115) or from data store 220. Such received data may be used to monitor for security threats (e.g., unusual crew actions and unusual flight plan information), including the following potential items with corresponding threat detection algorithms:

1. Significant deviation from the entered flight plan: For example, when a current position, heading, altitude, or speed of the aircraft (based on the flight parameters mentioned above) is more than a threshold (e.g., 10%) different than a planned position, heading, altitude, or speed, as indicated by the flight plan at a corresponding time.

2. Unexpectedly low flight plan: A flight planned at an unusually low altitude compared to a terrain in the EGPWS 200 terrain database 230 may be flagged as a potential security threat, even when the particular altitude is expressly planned in the flight plan. For example, when the EGPWS 200 compares the flight plan altitude to the elevation in the terrain database 230, and the flight plan altitude is within a threshold distance (e.g. 500 feet) of the elevation, such a plan may be flagged as being a potential security threat.

3. Descent at a substantial distance from the destination: Even when planned in the flight plan, a descent that takes place at a substantial distance from the destination may be flagged as a potential security threat. For example, when the descent planned in the flight plan is a threshold distance (e.g. more than ten miles) away from indicators included in the runway database 240 of EGPWS 200.

4. Change in the aircraft destination.

5. Destination without runway: A destination that does not have a runway, even when planned into the flight plan, may be flagged as a potential security threat. For example, when the destination planned in the flight plan does not have a runway, as indicated in the runway database 240, such a flight plan may be flagged as a potential security threat.

6. Flight over restricted airspace: Even when planned in the flight plan, a flight over restricted airspace may be flagged as a potential security threat. For example, when the route planned in the flight plan is compared to restricted airspace included in the obstacle database 230, and it is determined that the route intersects (e.g., the route crosses a boundary of) the restricted airspace, such a plan may be flagged as a potential security threat.

7. Deviations from path: In such cases where the flight plan includes deviations from paths defined for standard instrument approach procedures may be flagged as a potential security threat. For example, when the route planned in the flight plan is more than a threshold distance from the paths defined for standard instrument approach procedures, the paths being included in the runway database 240 or other EGPWS 200 database, may be flagged as a potential security threat.

The above item 1 (significant deviation from the entered flight plan) may be detected by monitoring, by the EGPWS 200, flight parameters (e.g., altitude, heading, etc.) of the aircraft based on input signals to the EGPWS 200; and detecting, by the EGPWS 200, significant deviations from the flight plan by comparing the retrieved flight plan to the monitored flight parameters.

The above items 2-3 and 5-7 may be detected by forecasting, by the EGPWS 200, the flight plan with respect to a various items included in the terrain database 230, the obstacle database 235, or the runway database 240, or other database of the EGPWS 200, so as to forecast relative interactions of the aircraft and the external environment and external aircraft features; and detecting, by EGPWS 200, anomalies based on the forecast relative interactions.

For instance, a relative interaction of the aircraft and the external environment may be that the aircraft is at a low altitude (closer to ground than is standard), even when the elevation above sea level is substantially normal. For instance, an elevation of 10,000 feet above sea level would not be abnormal, but an elevation of 10,000 feet planned in the flight plan near Denver, Colo., United States, would indicate a low altitude situation, as Denver is around 5,000 feet above sea level and the Rocky Mountains (near Denver) range up to around 14,000 feet above sea level. Another relative interaction might be that the flight plan may include a route with a trajectory that intersects restricted airspace. Each of the various interactions could be flagged as anomalies.

The above item 4 could be detected by the EGPWS 200 monitoring a data bus of the aircraft system 100 and noting that a destination has been changed in the flight plan.

Therefore, an on-board monitoring device (like EGPWS 200) may review a portion of a route or a portion of a route plan of a vehicle using the above described threat detection algorithms to detect security threats. For instance, the on-board monitoring device may compare the route plan against independent data sources including database of terrain, navigation aids, airways, runways and/or compare an aircraft state (as based on, e.g., sensors) such as GPS position, airspeed, altitude, vertical speed, attitude, and acceleration to the route plan, to detect unusual behavior as the security threat. Moreover, specific thresholds for the threat detection algorithms may be chosen to be able to be sensitive enough to detect threats while still minimizing nuisance alerts.

The EGPWS 200 may be provided with a datalink connection, such as aircraft satcom system 120, that allows off aircraft communication. By using an aircraft satcom system 120, the EGPWS 200 may transmit a validation request to a ground based service (or validation service), which may be an airline ground operations center, the United States Federal Aviation Administration (FAA), etc., to validate the above potential items, before issuing an alert of a security threat.

For example, the flight plan may be compared with the flight plan maintained by the airlines ground operations center. The weather at the destination may be checked to ensure that the aircraft was not making a legitimate diversion. Turbulence reports may be checked to ensure that altitude changes are the result of a flight crews actions to minimize turbulence. Specifically, the EGPWS 200 may transmit a portion of the flight (i.e., the significant deviation from the entered flight plan) or a portion of the flight plan (e.g., destination, change of destination, planned descent, flight path, etc.) to the validation service via the aircraft satcom system 120. The EGPWS 200 may also transmit an indication of what caused the portion of the flight or the portion of the flight plan to be flagged to the EGPWS 200 (e.g., low altitude compared to terrain of terrain database 230, destination has waypoint that is different than waypoint included in runway database 240, route of flight plan intersects restricted airspace, etc.).

The validation service may transmit a response back to the EGPWS 200 via the aircraft satcom system 120. The response may provide information for the EGPWS 200 to evaluate the potential item and determine whether the flagged condition is, or is not, a security threat; or the response may indicate that the potential item is or is not a security threat.

The same monitor functions proposed above could also potentially mitigate some cybersecurity issues where a database or flight plan is unintentionally changed or maliciously modified by authorized or unauthorized personal onboard the aircraft. The authorized or unauthorized personal may load the modified database or flight plan information in the aircraft with valid integrity mechanisms defeated. Cyclic redundancy checks (CRCs) are typically used to preclude corruption of data by the transmission mechanism; however valid CRCs can be readily created by a hacker and used to load seemingly valid data that has been subtly corrupted. The proposed algorithms for detecting unusual planned flight paths in the flight plan may also detect some cases of corruption due to cyber security issues.

Moreover, the EGPWS 200 may be equipped with a wireless communication mechanism, such as Wi-Fi. The EGPWS 200 may use the Wi-Fi interface to connect to the cabin Wi-Fi router 132, so as to alert the flight crew, flight attendants, or an on-board air marshal via personal communication devices 135.

Additionally, another aspect is that the EGPWS 200 may control a cockpit security door(s). Due to aircraft hijacking incidents, cockpit security doors (not shown) have been added to many aircraft. This has, however, resulted in events in which crew members were locked out of the cockpit and therefore were unable to intervene. The EGPWS 200 may include an interface to unlock the cockpit door in the event that significant flight path deviations are validated as a security threat (or one of the other potential items are validated as a security threat). For example, if the EGPWS 200 detects a potential item, the EGPWS 200 may transmit a message to the ground for confirmation; if the EGPWS 200 receives confirmation that the potential item is a security threat, the EGPWS 200 or another on-board system may automatically unlock the cockpit door. The EGPWS 200 may also (or alternatively) automatically change the aircraft transponder code to 7500 and alert Air Traffic Control (ATC) to the potential hijack. This would preclude both malicious unlock commands from the ground and unlocking of the door in the event of legitimate flight path changes such as weather diversions.

An additional aspect is that the connection from the EGPWS 200 to the ground (or the validation service) may be implemented by using the Cabin Wi-Fi Router 132 and the aircraft satcom system 120, together with a virtual private network (VPN) to provide security of the datalink. While there are cyber security concerns associated with linking cockpit systems (e.g., the EGPWS 200) to the cabin, these concerns would be mitigated (1) by the use of the VPN connection and (2) by the fact that, while the EGPWS 200 receives significant data from aircraft systems, the EGPWS 200 ability to transmit data to other aircraft systems is very limited. Moreover, the EGPWS 200 would have no way or very little control of the aircraft or ability to provide misleading guidance to the crew should it be hacked. However, it is likely that the crew would respond to such an alert by climbing to a safe altitude, so such a misleading guidance or nuisance alert would not in itself be a hazard.

Figure 3:
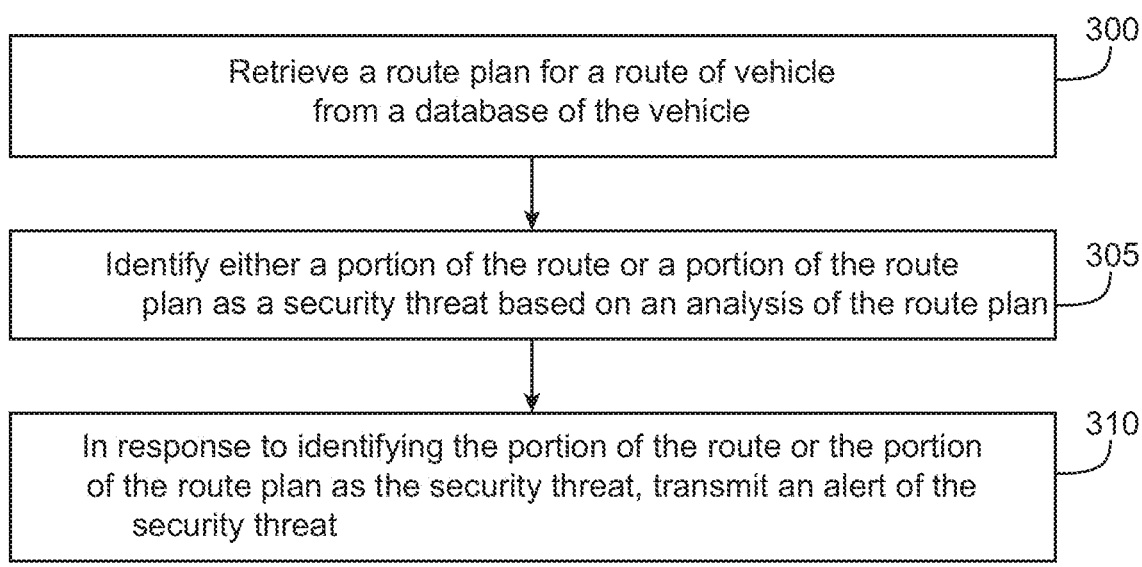
FIG. 3 depicts a flow chart of an exemplary method of detecting security threats, according to techniques presented herein.

FIG. 3 depicts a flow chart of an exemplary method for detecting security threats during vehicle operations utilizing an on-board monitoring system, according to techniques presented herein.

First, the on-board monitoring system may retrieve a route plan for a route of a vehicle from a database of the vehicle (block 300).

Then, the on-board monitoring system may identify either a portion of the route or a portion of the route plan to validate based on an analysis of the route plan (block 305).

Then, the on-board monitoring system may, in response to identifying the portion of the route or the portion of the route plan to validate, transmit a validation request to a validation service via a wireless communication interface (block 310).

Then, the on-board monitoring system may receive a response from the validation service via the wireless communication interface (block 315).

Then, the on-board monitoring system may identify the portion of the route or the portion of the route plan as a security threat based on the response from the validation service (block 320).

Then, the on-board monitoring system may, in response to identifying the portion of the route or the portion of the route plan as the security threat, transmit an alert of the security threat via the wireless communication interface (block 325).

Figure 4:
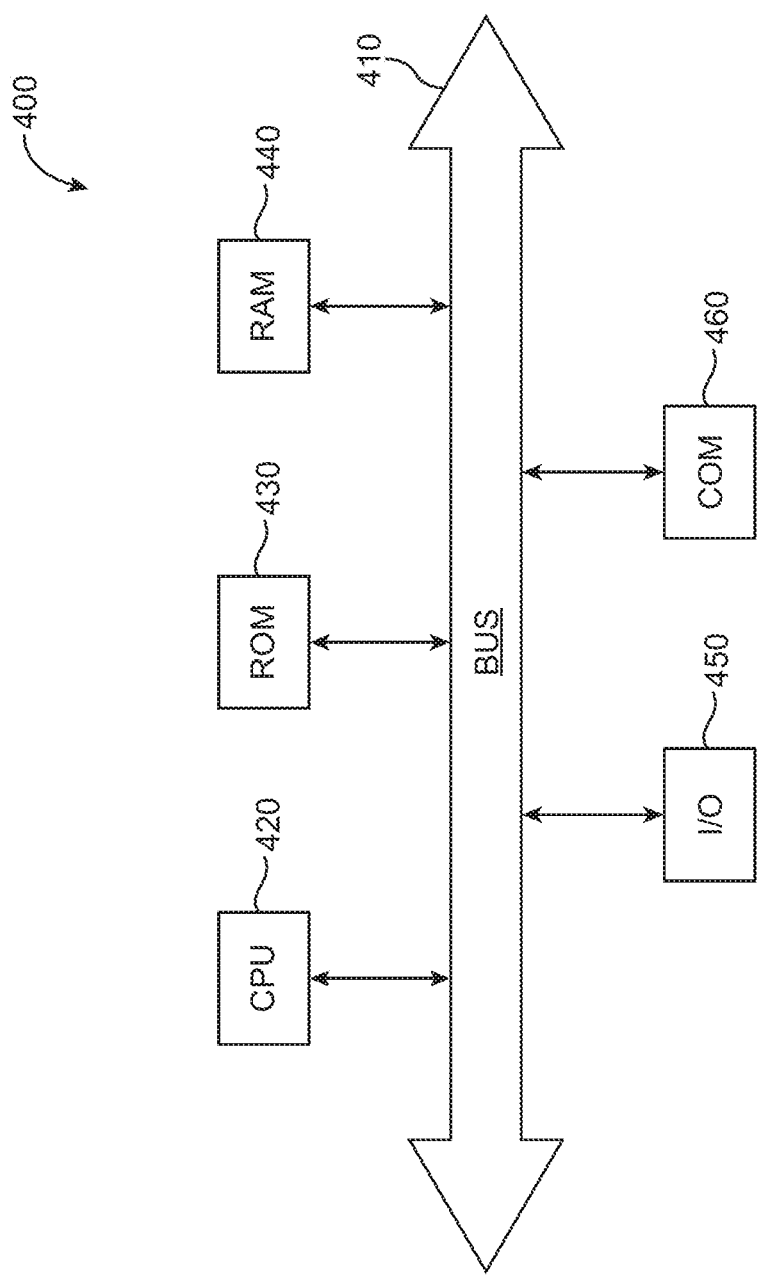
FIG. 4 depicts an example system that may execute techniques presented herein.

FIG. 4 is a simplified functional block diagram of a computer that may be configured as any of the systems of FIG. 1 to execute techniques described herein, according to exemplary embodiments of the present disclosure. Specifically, in one embodiment, any of the aircraft systems 100, including the EGPWS 200 and/or FMS 105, may be an assembly of hardware 400 including, for example, a data communication interface 460 for packet data communication. The platform may also include a central processing unit ("CPU") 420, in the form of one or more processors, for executing program instructions. The platform may include an internal communication bus 410, program storage, and data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for detecting security threats during vehicle operations utilizing an on-board monitoring system of a vehicle, comprising:
retrieving, by the on-board monitoring system, a route plan for a route of the vehicle from a database of the vehicle;
identifying, by the on-board monitoring system, either a portion of the route or a portion of the route plan as a security threat based on an analysis of the route plan by:
transmitting a validation request to a validation service via a wireless communication interface;
receiving a response from the validation service at the on-board monitoring system via the wireless communication interface;
identifying the portion of the route or the portion of the route plan as the security threat based on the response from the validation service; and
in response to identifying the portion of the route or the portion of the route plan as the security threat, transmitting, by the on-board monitoring system, an alert of the security threat.

2. The method of claim 1, wherein the identifying the portion of the route or the portion of the route plan as the security threat further includes, before the transmitting the validation request:
monitoring, by the on-board monitoring system, route parameters of the vehicle based on input signals to the on-board monitoring system,
detecting, by the on-board monitoring system, significant deviations from the route plan by comparing the retrieved route plan to the monitored route parameters, and
identifying the significant deviations as the portion of the route as the security threat.

3. The method of claim 1, wherein the identifying the portion of the route or the portion of the route plan as the security threat further includes, before the transmitting the validation request:
forecasting, by the on-board monitoring system, the route plan with respect to an external environment or external vehicle features, to forecast interactions,
detecting, by the on-board monitoring system, anomalies based on the forecast interactions, and
identifying the anomalies as the portion of the route plan as the security threat.

4. The method of claim 1, wherein the identifying the portion of the route or the portion of the route plan as the security threat further includes, before the transmitting the validation request:
detecting a destination change instruction for the route plan, and
identifying the destination change as the portion of the route plan as the security threat.

5. The method of claim 1, wherein the transmitting the alert of the security threat includes transmitting the alert to a personal communication device on board the vehicle via a wireless communication interface.

6. The method of claim 5, further comprising:
in response to transmitting the alert of the security threat, transmitting an unlock command to a security door of the vehicle.

7. The method of claim 1, wherein the vehicle is an aircraft, and the on-board monitoring system is an Enhanced Ground Proximity Warning System (EGPWS).

8. An on-board monitoring system for detecting security threats during vehicle operations of a vehicle, comprising:
a data storage device storing instructions associated with vehicle data systems; and
a processor configured to execute the instructions to perform a method including:
retrieving a route plan for a route of the vehicle from a database of the vehicle;
identifying either a portion of the route or a portion of the route plan as a security threat based on an analysis of the route plan by:
transmitting a validation request to a validation service via a wireless communication interface;
receiving a response from the validation service at the on-board monitoring system via the wireless communication interface;
identifying the portion of the route or the portion of the route plan as the security threat based on the response from the validation service; and
in response to identifying the portion of the route or the portion of the route plan as the security threat, transmitting an alert of the security threat.

9. The on-board monitoring system of claim 8, wherein the identifying the portion of the route or the portion of the route plan as the security threat further includes, before the transmitting the validation request:
monitoring route parameters of the vehicle based on input signals to the on-board monitoring system,
detecting significant deviations from the route plan by comparing the retrieved route plan to the monitored route parameters, and
identifying the significant deviations as the portion of the route as the security threat.

10. The on-board monitoring system of claim 1, wherein the identifying the portion of the route, or the portion of the route plan as the security threat further includes, before the transmitting the validation request:
forecasting the route plan with respect to an external environment or external vehicle features, to forecast interactions,
detecting anomalies based on the forecast interactions, and
identifying the anomalies as the portion of the route plan as the security threat.

11. The on-board monitoring system of claim 8, wherein the identifying the portion of the route or the portion of the route plan as the security threat further includes, before the transmitting the validation request:
detecting a destination change instruction for the route plan, and
identifying the destination change as the portion of the route plan as the security threat.

12. The on-board monitoring system of claim 8, wherein the transmitting the alert of the security threat includes
transmitting the alert to a personal communication device on board the vehicle via a wireless communication interface.

13. The on-board monitoring system of claim 12, wherein the method performed by the processor further includes:
in response to transmitting the alert of the security threat, transmitting an unlock command to a security door of the vehicle.

14. The on-board monitoring system of claim 8, wherein the vehicle is an aircraft, and the on-board monitoring system is an Enhanced Ground Proximity Warning System (EGPWS).

15. A non-transitory computer-readable medium storing instructions that, when executed by an on-board monitoring system, cause the on-board monitoring system to perform a method for detecting security threats during vehicle operations of a vehicle, the method comprising:
  retrieving a route plan for a route of the vehicle from a database of the vehicle;
  identifying either a portion of the route or a portion of the route plan as a security threat based on an analysis of the route plan by:
    transmitting a validation request to a validation service via a wireless communication interface;
    receiving a response from the validation service at the on-board monitoring system via the wireless communication interface;
    identifying the portion of the route or the portion of the route plan as the security threat based on the response from the validation service; and
  in response to identifying the portion of the route or the portion of the route plan as the security threat, transmitting an alert of the security threat.

16. The non-transitory computer-readable medium of claim 15, wherein the identifying the portion of the route or the portion of the route plan as a security threat further includes, before the transmitting the validation request:
  monitoring route parameters of the vehicle based on input signals to the on-board monitoring system,
  detecting significant deviations from the route plan by comparing the retrieved route plan to the monitored route parameters, and
  identifying the significant deviations as the portion of the route as the security threat.

17. The non-transitory computer-readable medium of claim 15, wherein the transmitting the alert of the security threat includes
  transmitting the alert to a personal communication device on board the vehicle via a wireless communication interface.

18. The non-transitory computer-readable medium of claim 17, wherein the method further comprises:
  in response to transmitting the alert of the security threat, transmitting an unlock command to a security door of the vehicle.

* * * * *